United States Patent
Lee et al.

(10) Patent No.: US 9,319,655 B2
(45) Date of Patent: Apr. 19, 2016

(54) ELECTRONIC DEVICE AND CORRESPONDING METHOD FOR DISPLAYING A STEREOSCOPIC IMAGE

(71) Applicant: LG Electronics Inc., Seoul (KR)

(72) Inventors: Shinhae Lee, Seoul (KR); Greg Jang, Seoul (KR); Hayang Jung, Seoul (KR); Taeyoung Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 173 days.

(21) Appl. No.: 13/662,032

(22) Filed: Oct. 26, 2012

(65) Prior Publication Data

US 2013/0155054 A1 Jun. 20, 2013

(30) Foreign Application Priority Data

Dec. 19, 2011 (KR) .................. 10-2011-0137053

(51) Int. Cl.
*H04N 13/00* (2006.01)

(52) U.S. Cl.
CPC ...... *H04N 13/0022* (2013.01); *H04N 2213/002* (2013.01)

(58) Field of Classification Search
CPC .................. H04N 13/022; H04N 13/002
USPC ........................................... 345/419
See application file for complete search history.

(56) References Cited

U.S. PATENT DOCUMENTS

| | | | |
|---|---|---|---|
| 2007/0081716 A1* | 4/2007 | Ha et al. | 382/154 |
| 2007/0236493 A1* | 10/2007 | Horiuchi et al. | 345/419 |
| 2008/0112616 A1* | 5/2008 | Koo et al. | 382/171 |
| 2008/0240549 A1 | 10/2008 | Koo et al. | |
| 2011/0018969 A1* | 1/2011 | Tanaka | 348/47 |
| 2011/0210965 A1* | 9/2011 | Thorpe | 345/419 |
| 2011/0211042 A1* | 9/2011 | Thorpe et al. | 348/43 |
| 2013/0009946 A1* | 1/2013 | Horii | 345/419 |

FOREIGN PATENT DOCUMENTS

| | | |
|---|---|---|
| CN | 1795682 A | 6/2006 |
| CN | 101276060 A | 10/2008 |
| EP | 1 628 490 A1 | 2/2006 |
| EP | 2 362 668 A2 | 8/2011 |

* cited by examiner

*Primary Examiner* — Kee M Tung
*Assistant Examiner* — Ryan M Gray
(74) *Attorney, Agent, or Firm* — Birch, Stewart, Kolasch & Birch, LLP

(57) ABSTRACT

An electronic device including a display module including a panel for generating stereoscopic vision, and configured to display a stereoscopic image using the panel; and a controller configured to display a first stereoscopic image, receive a request to shift the first stereoscopic image, and change a negative parallax of the first stereoscopic image to be a positive parallax based on the received request.

4 Claims, 12 Drawing Sheets (a)            (b)

(a)　　　　　　　　　　　　(b)

ELECTRONIC DEVICE AND CORRESPONDING METHOD FOR DISPLAYING A STEREOSCOPIC IMAGE

CROSS-REFERENCE TO A RELATED APPLICATION

This application claims benefit and priority from Korean Patent Application No. 10-2011-0137053, filed Dec. 19, 2011, the subject matters of which are hereby incorporated by reference.

BACKGROUND OF THE INVENTION

1. Field of the Invention

The present invention relates to shifting a stereoscopic image in an electronic device such as a mobile terminal, for example.

2. Background of the Invention

The eyes of a human are spaced apart from each other by a predetermined distance, which causes the left and right eyes to view respective different images. Such a phenomenon is called "binocular parallax." Images viewed by the left eye's image and right eye's image are synthesized by the brain into a single image, and thus the user sees a 3D effect.

Many devices are now capable of displaying 3D images using binocular parallax. These devices generate the 3D effects by displaying the left eye's image and right eye's image with their horizontal positions misaligned with respect to each other, thereby allowing an object to appear as if it is protruded or depressed from the display surface.

However, many users feel dizzy or become tired when viewing 3D images displayed based on binocular parallax. The 3D effect also tends to give some users a headache.

SUMMARY OF THE INVENTION

Accordingly, one aspect of the present invention is to provide an electronic device including a display module including a panel configured to implement stereoscopic vision and a controller configured to perform control so that when receiving a request to shift a first stereoscopic image to another image, parallax of the first stereoscopic image displayed during the screen shift is included in a predetermined range.

According to another aspect, the present invention provides an electronic device including a display module including a panel configured to implement stereoscopic vision and a controller configured to gradually move a first stereoscopic image toward a first edge of a screen when the first stereoscopic image starts to be shifted to another image and configured to control parallax of the first stereoscopic image so that the parallax is gradually changed depending on a distance from the first edge.

According to still another aspect, the present invention provides a method of controlling an electronic device including a panel configured to implement stereoscopic vision, and which includes displaying a first stereoscopic image, receiving a request to shift the first stereoscopic image to a second stereoscopic image, adjusting parallax of the first and second stereoscopic images displayed during the screen shift to be included in a predetermined range, and restoring the parallax of the first and second images to an original value when the screen shift is finished.

BRIEF DESCRIPTION OF THE DRAWINGS

The accompanying drawings, which are included to provide a further understanding of described embodiments of the present invention and are incorporated in and constitute a part of this specification, illustrate embodiments of the present invention and together with the description serve to explain aspects and features of the present invention.

FIGS. 8 and 9 illustrate examples of changes in parallax depending on a screen shift according to the first embodiment of the present invention.

FIG. 10 illustrates a gradual change in parallax during the screen shift according to the first embodiment of the present invention.

DETAILED DESCRIPTION OF EMBODIMENTS OF THE PRESENT INVENTION

Embodiments of the present invention will now be described more fully with reference to the accompanying drawings, in which certain embodiments of the invention are illustrated. The invention may, however, be embodied in many different forms and should not be construed as being limited to the embodiments set forth herein; rather, these embodiments are described and/or illustrated so that this disclosure will be more thorough and complete, and will more fully convey the aspects of the invention to those skilled in the art.

Hereinafter, an electronic device according to embodiments of the present invention will be described below in more detail with reference to the accompanying drawings. In the following description, the suffixes "module" and "unit" are used in reference to components of the electronic device for convenience of description and do not have meanings or functions different from each other.

The electronic devices described herein may include a cellular phone, a smart phone, a laptop computer, a digital broadcasting terminal, a personal digital assistant (PDA), a portable multimedia player (PMP), and a navigation system.

Figure 1:
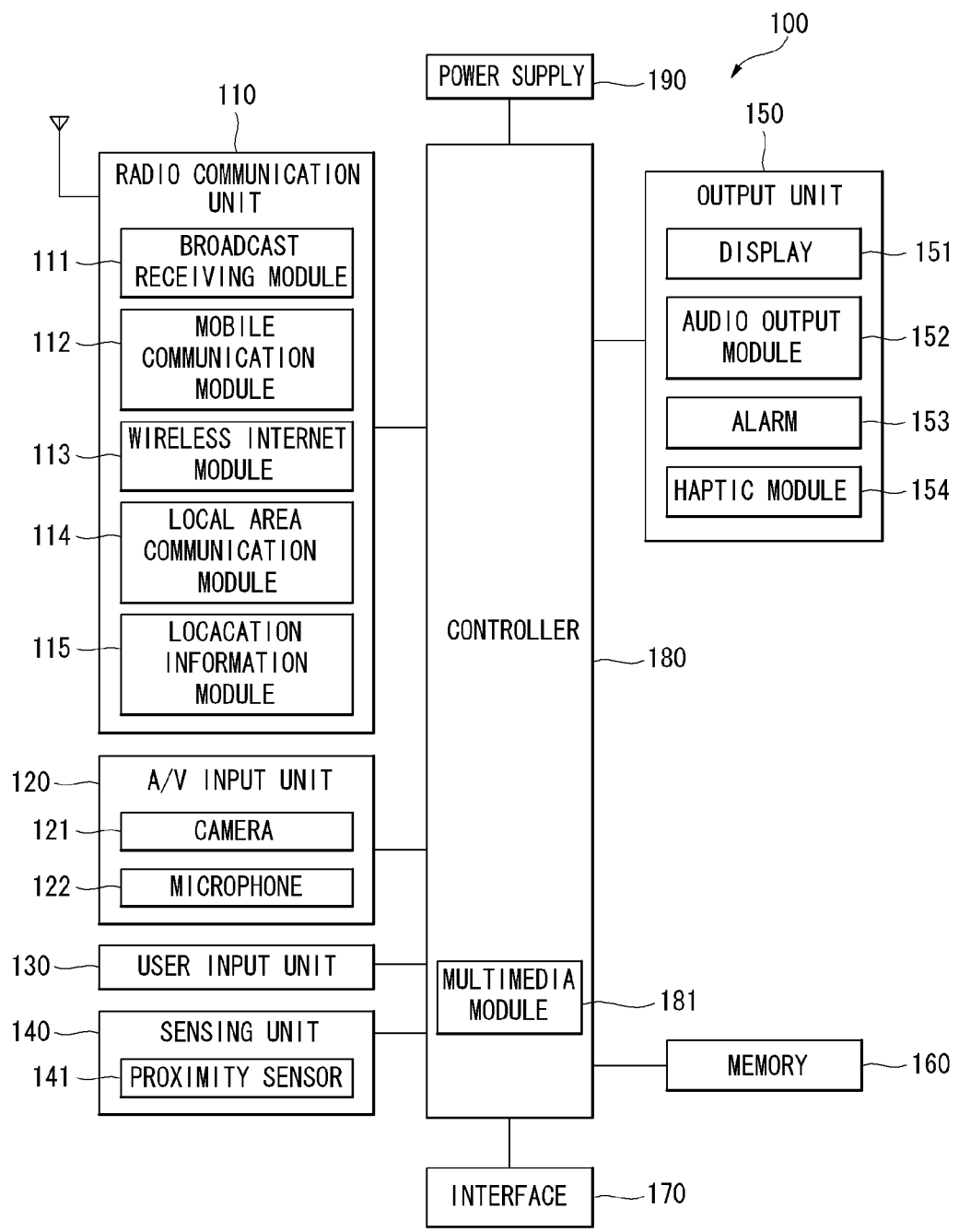
FIG. 1 is a block diagram illustrating a configuration of an electronic device according to an embodiment of the present invention.

FIG. 1 is a block diagram of an electronic device 100 according to an embodiment of the present invention. It is understood that other embodiments, configurations and arrangements may also be provided. With reference to FIG. 1, the electronic device 100 includes a wireless communication unit 110, an audio/video (A/V) input unit 120, a user input unit 130, a sensing unit 140, an output unit 150, a memory 160, an interface unit 170, a controller 180, and a power supply 190. Not all of the components shown in FIG. 1 are essential, and the number of components included in the electronic device 100 may be varied. The components of the electronic device 100, as illustrated with reference to FIG. 1 will now be described.

The wireless communication unit 110 may include at least one module that enables wireless communication between the electronic device 100 and a wireless communication system or between the electronic device 100 and a network in which the electronic device 100 is located. For example, the wireless communication unit 110 may include a broadcast receiving module 111, a mobile communication module 112, a wireless Internet module 113, a local area (or short-range) communication module 114, and a location information (or position-location) module 115.

The broadcast receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, wireless broadcasting signals, and data broadcasting signals, but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in any of various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcast receiving module 111 may receive broadcasting signals using various broadcasting systems. More particularly, the broadcast receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO™) system, a DVB-H system, and an integrated services digital broadcast-terrestrial (ISDB-T) system. The broadcast receiving module 111 may receive signals from broadcasting systems providing broadcasting signals other than the above-described digital broadcasting systems.

The broadcasting signals and/or broadcasting related information received through the broadcast receiving module 111 may be stored in the memory 160. The mobile communication module 112 may transmit/receive a wireless signal to/from at least one of a base station, an external terminal and a server on a mobile communication network. The wireless signal may include a voice call signal, a video call signal or data in various forms according to the transmission and reception of text/multimedia messages.

The wireless Internet module 113 may correspond to a module for wireless Internet access and may be included in the electronic device 100 or may be externally attached to the electronic device 100. Wireless LAN (WLAN or Wi-Fi), wireless broadband (Wibro™), world interoperability for microwave access (Wimax™), high speed downlink packet access (HSDPA) and other technologies may be used as a wireless Internet technique.

The local area communication module 114 may correspond to a module for local area communication. Further, Bluetooth™, radio frequency identification (RFID), infrared data association (IrDA), ultra wideband (UWB) and/or Zig-Bee™ may be used as a local area communication technique.

The position-location module 115 may confirm or obtain the position of the electronic device 100. The position-location module 115 may obtain position information by using a global navigation satellite system (GNSS). The GNSS refers to a radio navigation satellite system that revolves around the earth and transmits reference signals to predetermined types of radio navigation receivers such that the radio navigation receivers may determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan among others.

A global positioning system (GPS) module is one example of the position-location module 115. The GPS module 115 may calculate information regarding distances between one point or object and at least three satellites and information regarding a time when the distance information is measured and apply trigonometry to the obtained distance information to obtain three-dimensional position information on the point or object according to latitude, longitude and altitude at a predetermined time. A method of calculating position and time information using three satellites and correcting the calculated position and time information using another satellite may also be used. In addition, the GPS module 115 may continuously calculate the current position in real time and calculate velocity information using the location or position information.

Referring to FIG. 1, the A/V input unit 120 may input an audio signal or a video signal and include a camera 121 and a microphone 122. The camera 121 processes image frames of still images or moving pictures obtained by an image sensor in a video call mode or a photographing mode. The processed image frames can then be displayed on a display module 151 which may be a touch screen.

The image frames processed by the camera 121 may be stored in the memory 160 or may be transmitted to an external device through the wireless communication unit 110. The electronic device 100 may also include at least two cameras 121.

Further, the microphone 122 may receive an external audio signal in a call mode, a recording mode or a speech recognition mode and process the received audio signal into electronic audio data. The audio data may then be converted into a form that may be transmitted to a mobile communication base station through the mobile communication module 112 and output in the call mode. The microphone 122 may employ various noise removal algorithms (or noise canceling algorithms) for removing or reducing noise generated when the external audio signal is received.

The user input unit 130 may receive input data required for controlling the electronic device 100 from a user. The user input unit 130 may include a keypad, a dome switch, a touch pad (e.g., constant voltage/capacitance), a jog wheel, and a jog switch.

The sensing unit 140 may sense a current state of the electronic device 100, such as an open/closed state of the electronic device 100, a position of the electronic device 100, whether a user touches the electronic device 100, a direction of the electronic device 100, and acceleration/deceleration of the electronic device 100, and generate a sensing signal required for controlling the electronic device 100. For example, if the electronic device 100 is a slide phone, the sensing unit 140 may sense whether the slide phone is opened or closed. Further, the sensing unit 140 may sense whether the power supply 190 supplies power and/or whether the interface unit 170 is connected to an external device. The sensing unit 140 may also include a proximity sensor 141.

The output unit 150 may generate visual, auditory and/or tactile output and may include the display module 151, an audio output module 152, an alarm unit 153 and a haptic module 154. The display module 151 may display information processed by the electronic device 100. The display module 151 may display a user interface (UI) or a graphic user interface (GUI) related to a voice call when the electronic device 100 is in the call mode. The display module 151 may also display a captured and/or received image and a UI or a GUI when the electronic device 100 is in the video call mode or the photographing mode.

In addition, the display module 151 may include at least a liquid crystal display, a thin film transistor liquid crystal display, an organic light-emitting diode display, a flexible display or a three-dimensional display. Some of these displays may be of a transparent type or a light transmissive type. That is, the display module 151 may include a transparent display.

The transparent display may include a transparent liquid crystal display. The rear of the display module 151 may include a light transmissive type display. Accordingly, a user may be able to see an object located behind the body of the electronic device 100 through the transparent portion of the display unit 151 on the body of the electronic device 100.

The electronic device 100 may also include at least two display modules 151. For example, the electronic device 100 may include a plurality of display modules 151 that are arranged on a single face of the electronic device 100 and spaced apart from each other at a predetermined distance or that are integrated together. The plurality of display modules 151 may also be arranged on different sides of the electronic device 100.

Further, when the display module 151 and a touch-sensing sensor (hereafter referred to as a touch sensor) form a layered structure that is referred to as a touch screen, the display module 151 may be used as an input device in addition to an output device. The touch sensor may be in the form of a touch film, a touch sheet, or a touch pad, for example.

The touch sensor may convert a variation in pressure, applied to a specific portion of the display module 151, or a variation in capacitance, generated at a specific portion of the display module 151, into an electric input signal. The touch sensor may sense pressure, position, and an area (or size) of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display module 151.

The proximity sensor 141 of the sensing unit 140 may be located in an internal region of the electronic device 100, surrounded by the touch screen, or near the touch screen. The proximity sensor 141 may sense the presence of an object approaching a predetermined sensing face or an object located near the proximity sensor using an electromagnetic force or infrared rays without mechanical contact. The proximity sensor 141 may have a lifetime longer than a contact sensor and may thus be more appropriate for use in the electronic device 100.

The proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be considered as a proximity sensor 141.

For convenience, an action in which a pointer approaches the touch screen without actually touching the touch screen may be referred to as a proximity touch, and an action in which the pointer is brought into contact with the touch screen may be referred to as a contact touch. The proximity touch point of the pointer on the touch screen may correspond to a point of the touch screen at which the pointer is perpendicular to the touch screen.

The proximity sensor 141 may sense the proximity touch and a proximity touch pattern (e.g., a proximity touch distance, a proximity touch direction, a proximity touch velocity, a proximity touch time, a proximity touch position, a proximity touch moving state). Information corresponding to the sensed proximity touch action and proximity touch pattern may then be displayed on the touch screen.

The audio output module 152 may output audio data received from the wireless communication unit 110 or stored in the memory 160 in a call signal receiving mode, a call mode or a recording mode, a speech recognition mode and a broadcast receiving mode. The audio output module 152 may output audio signals related to functions performed in the electronic device 100, such as a call signal incoming tone and a message incoming tone. The audio output module 152 may include a receiver, a speaker, and/or a buzzer. The audio output module 152 may output sounds through an earphone jack. The user may listen to the sounds by connecting an earphone to the earphone jack.

The alarm unit 153 may output a signal indicating generation (or occurrence) of an event of the electronic device 100. For example, alarms may be generated when a call signal or a message is received and when a key signal or a touch is input. The alarm unit 153 may also output signals different from video signals or audio signals, for example, a signal indicating generation of an event through vibration. The video signals or the audio signals may also be output through the display module 151 or the audio output module 152.

The haptic module 154 may generate various haptic effects that the user may feel. One of the haptic effects is vibration. The intensity and/or pattern of a vibration generated by the haptic module 154 may also be controlled. For example, different vibrations may be combined with each other and output or may be sequentially output.

The haptic module 154 may generate a variety of haptic effects including an effect attributed to an arrangement of pins vertically moving against a contact skin surface, an effect attributed to a jet force or a suctioning force of air through a jet hole or a suction hole, an effect attributed to a rubbing of the skin, an effect attributed to contact with an electrode, an effect of stimulus attributed to an electrostatic force, and an effect attributed to a reproduction of cold and warmth using an element for absorbing or radiating heat in addition to vibrations.

The haptic module 154 may not only transmit haptic effects through direct contact but may also allow the user to feel haptic effects through the user's fingers or arms. The electronic device 100 may also include a plurality of haptic modules 154.

The memory 160 may store a program for operating the controller 180 and temporarily store input/output data such as a phone book, messages, still images, and/or moving pictures. The memory 160 may also store data regarding various patterns of vibrations and sounds that are output from when a touch input is applied to the touch screen.

The memory 160 may include at least a flash memory, a hard disk type memory, a multimedia card micro type memory, a card type memory such as SD or XD memory, a random access memory (RAM), a static RAM (SRAM), a read-only memory (ROM), an electrically erasable programmable ROM (EEPROM), a programmable ROM (PROM) magnetic memory, a magnetic disk, or an optical disk. The electronic device 100 may also operate in association with a web storage performing the storage function of the memory 160 on the Internet.

The interface unit 170 may serve as a path to external devices connected to the electronic device 100. The interface unit 170 may receive data or power from the external devices, transmit the data or power to internal components of the electronic device 100, or transmit data of the electronic device 100 to the external devices. For example, the interface unit 170 may include a wired/wireless headset port, an external charger port, a wired/wireless data port, a memory card port, a port for connecting a device having a user identification module, an audio I/O port, a video I/O port, and/or an earphone port.

The interface unit 170 may also interface with a user identification module that is a chip that stores information for authenticating authority to use the electronic device 100. For example, the user identification module may be a user identity module (UIM), a subscriber identity module (SIM) and a universal subscriber identify module (USIM). An identification device including the user identification module may also be manufactured in the form of a smart card. Accordingly, the identification device may be connected to the electronic device 100 through a port of the interface unit 170.

The interface unit 170 may also be a path through which power from an external cradle is provided to the electronic device 100 when the electronic device 100 is connected to the external cradle or a path through which various command signals input by the user through the cradle are provided to the electronic device 100. The various command signals or power input from the cradle may be used as signals for checking whether the electronic device 100 is correctly settled (or loaded) in the cradle.

The controller 180 may control overall operations of the electronic device 100. For example, the controller 180 may control and process voice communication, data communication and/or a video call. The controller 180 may also include a multimedia module 181 for playing a multimedia file. The multimedia module 181 may be included in the controller 180 as shown in FIG. 1 or may be separated from the controller 180.

The controller 180 may perform a pattern recognition process of recognizing handwriting input or picture-drawing input applied to the touch screen as characters or images. The power supply 190 may receive external power and internal power and provide power required for operating the components of the electronic device 100 under the control of the controller 180.

According to a hardware implementation, embodiments of the present invention may be implemented using at least application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. The embodiments may be implemented using the controller 180.

According to a software implementation, embodiments including procedures or functions may be implemented using a separate software module executing at least one function or operation. Software code may be implemented according to a software application written in an appropriate software language. The software codes may be stored in the memory 160 and executed by the controller 180.

Figure 2:
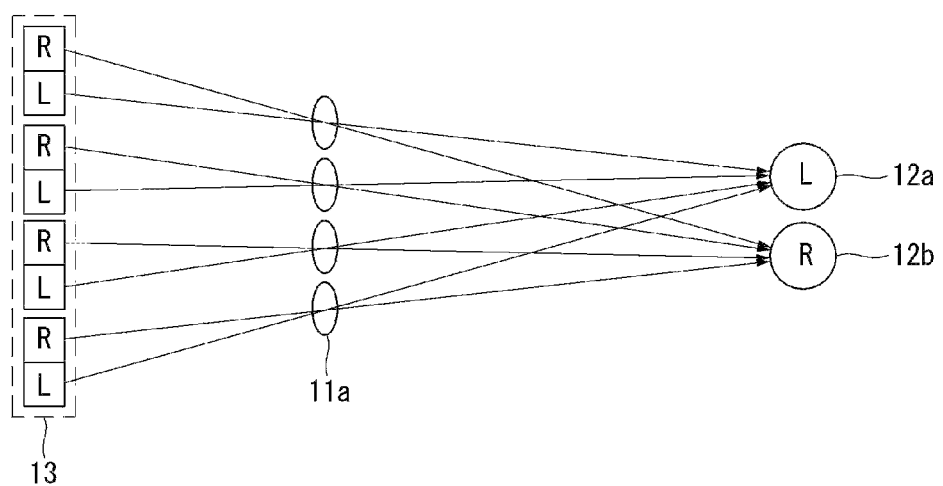
FIGS. 2 and 3 are views for describing a method of displaying a stereoscopic image using binocular parallax according to embodiments of the present invention.
Figure 3:
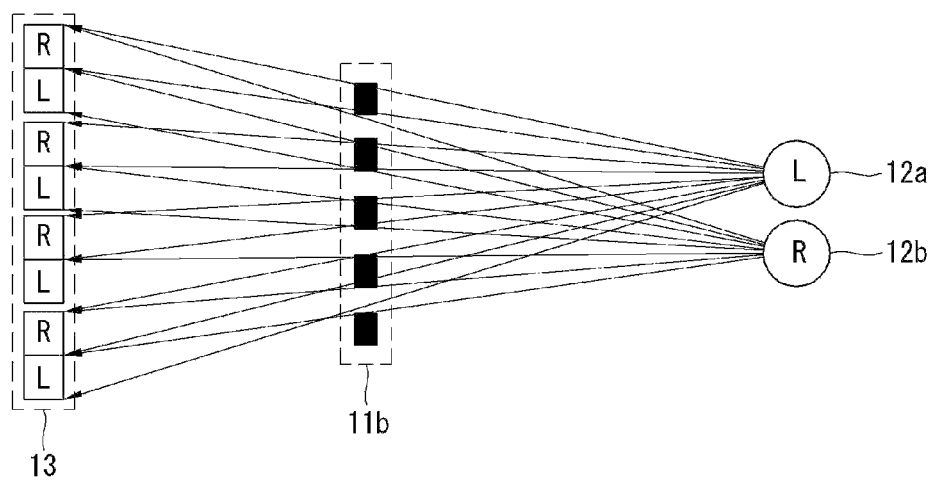

Next, FIGS. 2 and 3 are diagrams for describing a stereoscopic image display method using binocular parallax according to embodiments of the present invention. In particular, FIG. 2 illustrates a method using a lenticular lens array and FIG. 3 illustrates a method using a parallax barrier.

In more detail, binocular parallax refers to a difference in the apparent position of an object viewed along two different lines of sight. When an image seen by the left eye of a person and an image seen by his right eye are composed in the brain, the person sees the composed image as a stereoscopic image.

In the following description, the visual perception of depth due to human binocular parallax is referred to as 'stereoscopic vision' and an image causing stereoscopic vision is referred to as 'stereoscopic image'. In addition, when a specific object included in an image causes stereoscopic vision, this object is referred to as "stereoscopic object'. Further, contents produced to cause stereoscopic vision is called 'stereoscopic contents'. The stereoscopic contents may include stereoscopic images, stereoscopic objects, etc.

Further, stereoscopic image display methods using binocular parallax are classified into stereoscopic display methods requiring special glasses and autostereoscopic display methods requiring no glasses. The stereoscopic display methods include a method using colored glasses, polarizing glasses using shading effect due to a polarized light difference, field sequential glasses that alternately provide left eye's image and right eye's image within the afterimage time of the eye, etc. In addition, there is a method using filters having different transmissivities for the left and right eyes of a user to obtain stereoscopic effect with respect to a horizontal motion according to a time difference of the visual system caused by a transmissivity difference.

The autostereoscopic display methods that obtain stereoscopic effect from an image display side rather than an observer include a method of using a parallax barrier, a method of using a lenticular lens, a method of using a microlens array, etc.

Referring to FIG. 2, the display unit 151 includes a lenticular lens array 11a to display a stereoscopic image. The lenticular lens array 11a is located between the left and right eyes 12a and 12b and a display plane 13 on which pixels L to be input to the left eye 12a and pixels R to be input to the right eye 12b are alternately arranged in the horizontal direction, and provides optical discriminative directivity with respect to the pixels L to be input to the left eye 12a and the pixels R to be input to the right eye 12b. Accordingly, an image that has passed through the lenticular lens array 11a is separated and seen by the left eye 12a and the right eye 12b, and an image seen by the left eye 12a and an image seen by the right eye 12b are composed in the human brain to be seen as a stereoscopic image.

Referring to FIG. 3, the display module 151 for displaying a stereoscopic image includes a parallax barrier 11b in the form of a vertical lattice. The parallax barrier 11b is located between the left and right eyes 12a and 12b and the display plane 13 on which the pixels L to be input to the left eye 12a and the pixels R to be input to the right eye 12b are alternately arranged in the horizontal direction and includes vertically arranged apertures to allow an image to be separated and seen by the left eye 12a and the right eye 12b. Accordingly, an image seen by the left eye 12a and an image seen by the right eye 12b are composed in the human brain to be seen as a stereoscopic image. The parallax barrier 11b is turned on to separate an input image only when a stereoscopic image needs to be displayed and turned off to pass an input image without separating it when a 2D image needs to be displayed.

The above-mentioned stereoscopic image display methods have been described to explain embodiments of the present invention and the present invention is not limited thereto. However, the present invention can display stereoscopic images using binocular parallax through various methods in addition to the above-described methods.

Figure 4:
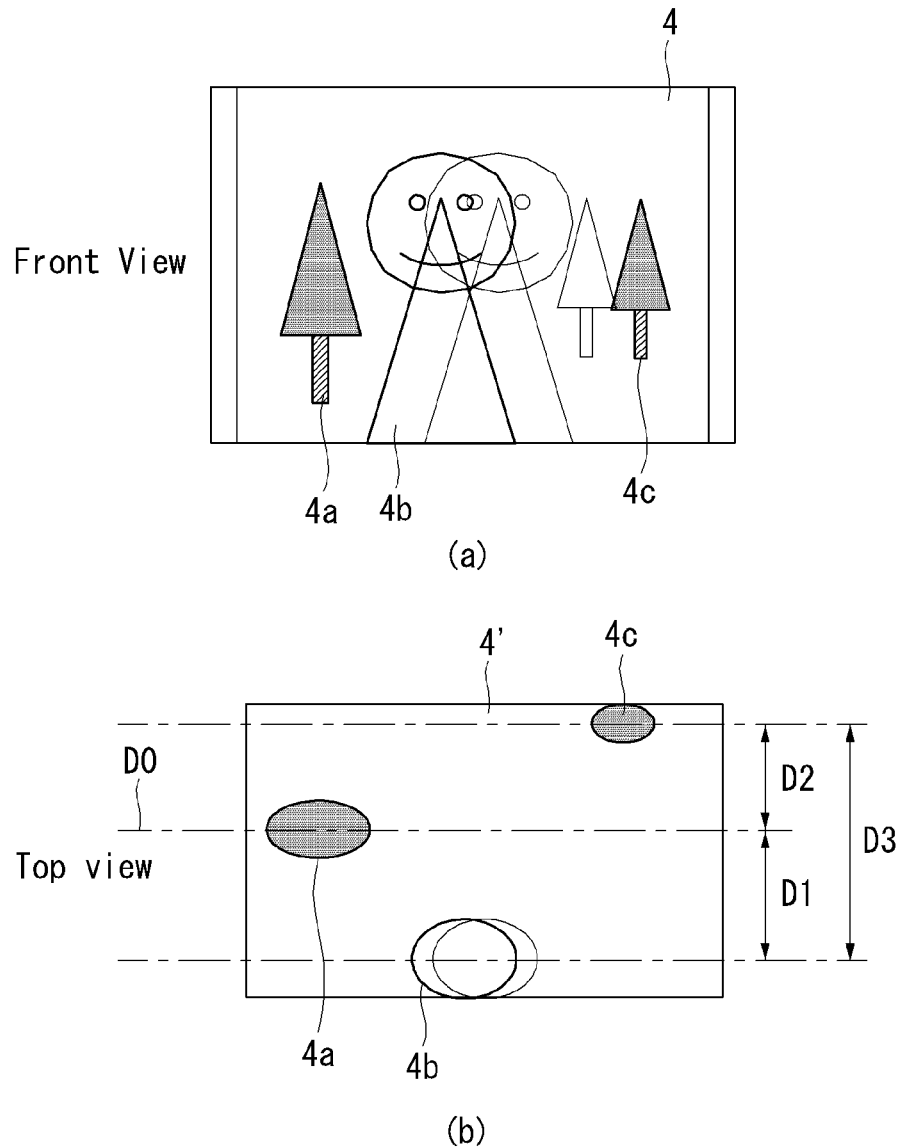
FIG. 4 is a view for describing a depth of a stereoscopic image according to stereoscopic vision of the stereoscopic image according to an embodiment of the present invention.

Next, FIG. 4 is a view for describing a depth of a stereoscopic image according to stereoscopic vision of the stereoscopic image according to an embodiment of the present invention. In particular, FIG. 4(a) of FIG. 4 illustrates an example where a stereoscopic image 4 displayed through the display module 151 is viewed from the front, and FIG. 4(b) illustrates an example where a virtual stereoscopic space 4' generated due to stereoscopic vision by the stereoscopic image 4 is viewed from the top.

Referring to FIG. 4(a), objects 4a, 4b, and 4c included in the stereoscopic image 4 have different degrees of parallax. Here, the parallax occurs due to a display point on the left eye's image of an object and a display point on the right eye's image of the object.

Such parallax of the objects gives the objects stereoscopic effects, i.e., depths according to stereoscopic vision, which vary depending on the degrees of the parallax. For example, as the depth of an object comes close to the display plane, the degree of parallax of the object reduces, and as the depth gets away from the display plane, the degree of parallax increases.

Taking as an example what is illustrated in FIG. 4(b), the first object 4a, which has little parallax, has a depth D0 corresponding to the display plane, and the second and third objects 4b and 4c, which have larger depths than that of the first object 4a respectively have a depth D1 to allow the object 4b to appear to be protruded from the display plane and a depth D2 to allow the object 4c to appear to be depressed from the display plane.

For convenience, when providing a 3D effect so that an object appears to be depressed from the display plane, the parallax is hereinafter referred to as "positive parallax," and when providing a 3D effect so that the object appears to be protruded from the display plane, the parallax is hereinafter referred to as "negative parallax."

According to FIG. 4(b), the second object 4b has a negative parallax, so that it appears to be protruded from the display plane D0 in the virtual stereoscopic space 4, and the third object 4c has a positive parallax, so that it appears to be depressed from the display plane in the virtual stereoscopic space 4'. Further, because the first object 4a does not exhibit parallax, it appears as if it is positioned on the display surface D0. Accordingly, the first object 4a is focused.

The embodiments disclosed herein may be implemented by the electronic device 100 described in connection with FIG. 1. As used herein, the display module 151 may include a panel to implement stereoscopic vision. The panel may have a structure to implement stereoscopic vision in the above-described lenticular lens type or parallax barrier type.

The display module 151 is assumed to be a touch screen 151. As described above, the touch screen 151 may perform information display/input functions, but not limited thereto. As used herein, a touch gesture refers to a gesture implemented by the contact touch or proximity touch, and a touch input refers to an input received through the touch gesture.

Examples of the touch gesture may include, according to the action, tapping, dragging, flicking, pressing, multi touch, pinch in, and pinch out. "Tapping" refers to an action of lightly pressing the touch screen 151 with, e.g., a finger, and then taking it back. Tapping is a touch gesture similar to mouse clicking in case of a general computer.

"Dragging" refers to an action of moving, e.g., a finger, to a particular location with the touch screen 151 touched, and then taking it back. While dragged, an object may remain displayed along the direction of dragging. "Flicking" refers to an action of, after the touch screen 151 is touched, moving, e.g., a finger, along a certain direction (e.g., upper, lower, left, right, or diagonal direction) and then taking it back. When receiving a touch input by flicking, the electronic device 100 performs a specific operation, e.g., page turning of an e-book, based on the direction and speed of flicking.

"Pressing" refers to an action of maintaining a touch on the touch screen 151 during a predetermined time. "Multi touch" refers to an action of touching multiple points on the touch screen 151. "Pinch in" refers to an action of performing dragging so that multiple points multi-touched on the touch screen 151 come closer to each other. Specifically, "pinch in" allows multi-touched multiple points to be dragged in the direction of coming closer to each other, starting from at least one of the multi-touched multiple points.

"Pinch out" refers to an action of performing dragging so that multiple points multi-touched on the touch screen 151 go apart from each other. Specifically, "pinch out" allows multi-touched multiple points to be dragged in the direction of being apart from each other, starting from at least one of the multi-touched multiple points.

A method of controlling an electronic device and an operation of the electronic device according to a first embodiment of the present invention will now be described in greater detail with reference to the drawings.

Figure 5:
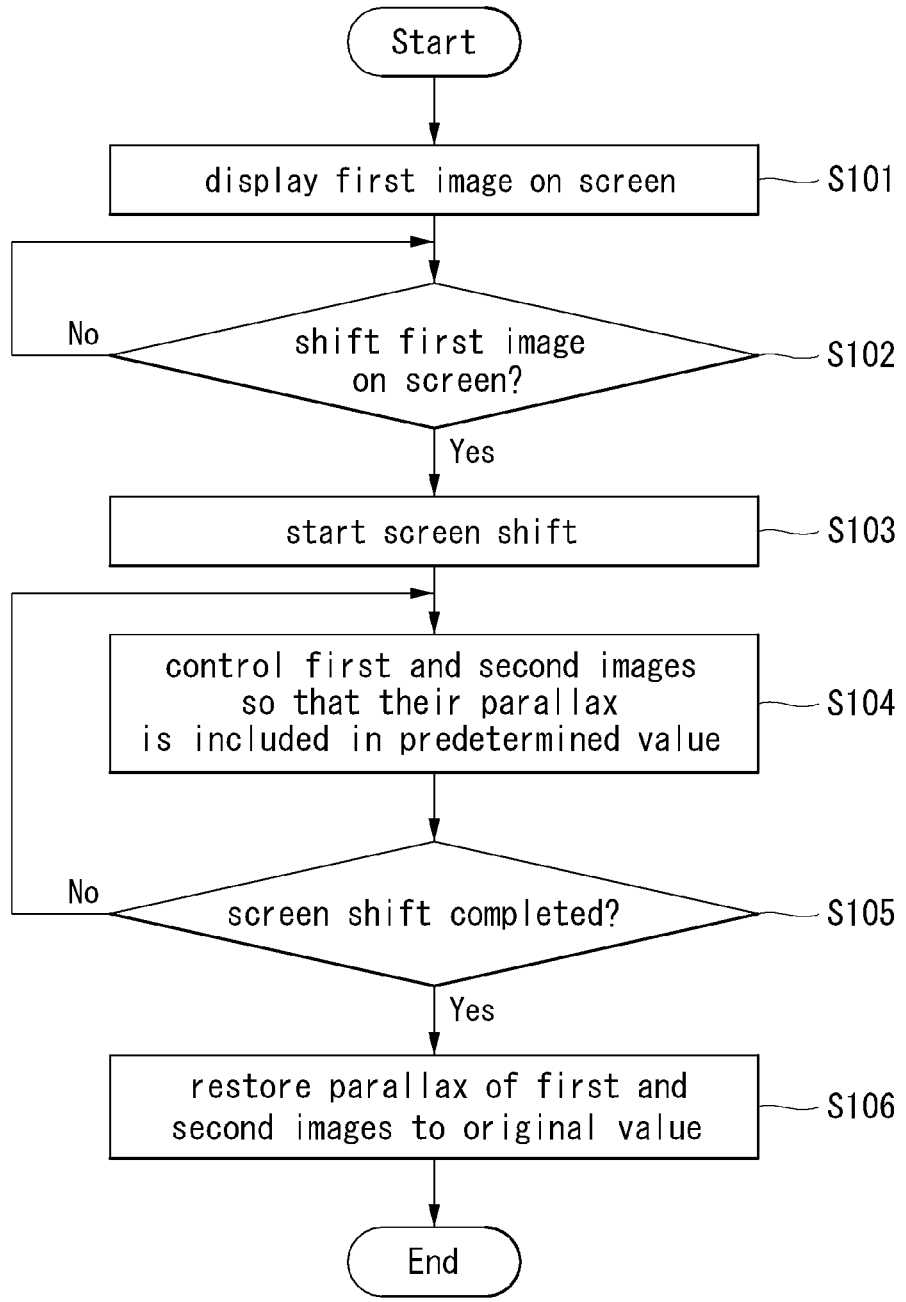
FIG. 5 is a flowchart illustrating a method of controlling an electronic device according to a first embodiment of the present invention.

In particular, FIG. 5 is a flowchart illustrating a method of controlling the electronic device 100 according to a first embodiment of the present invention. FIGS. 6 to 10 are views for describing the control method according to the first embodiment of the present invention.

Referring to FIG. 5, the controller 180 displays a first image based on a user's control input (S101). While displaying the first image, the controller 180 can activate the panel in the display module 151 to display a stereoscopic image. In response to a request that the first image be shifted to a second image (Yes in S102), the controller 180 initiates a screen shift process (S103).

When the screen shift process begins, the parallax degrees of the first and second images are controlled to be within a preset range (S104). That is, when the screen shift process starts, the depths of the first and second images are controlled to belong to a preset depth range. Further, upon starting the screen shift process, the controller 180 gradually shifts the first and second images.

Thereafter, when the screen shift process is finished (Yes in S105), the controller 180 restores the parallax degrees of the first and second images into the original parallax degrees of the first and second images (S106). In step S104, when the screen begins shifting, the controller 180 can control the parallax degree of the first image so that the first image is viewed as if it is depressed from the display plane.

For example, if among objects included in the first image are objects viewed as if they are protruded from the display plane, i.e., objects having a negative parallax, the controller 180 can remove the parallax from the objects or adjust the parallax to be shifted into positive parallax. The parallax degree of each object may also be controlled by relocating the object in left eye's image and right eye's image of the first image.

For example, if the first image appears to be protruded from the display plane, the controller 180 can adjust the overall parallax of the first image to relocate the focus to an object closest to the display plane. That is, the overall parallax of the first image can be adjusted by a particular value so that the parallax of the object located closest to the display plane is removed or changed to positive parallax. Such adjustment of the overall parallax of the first image can be controlled by shifting the location of synchronization of the left eye's image and right eye's image of the first image.

Figure 6:
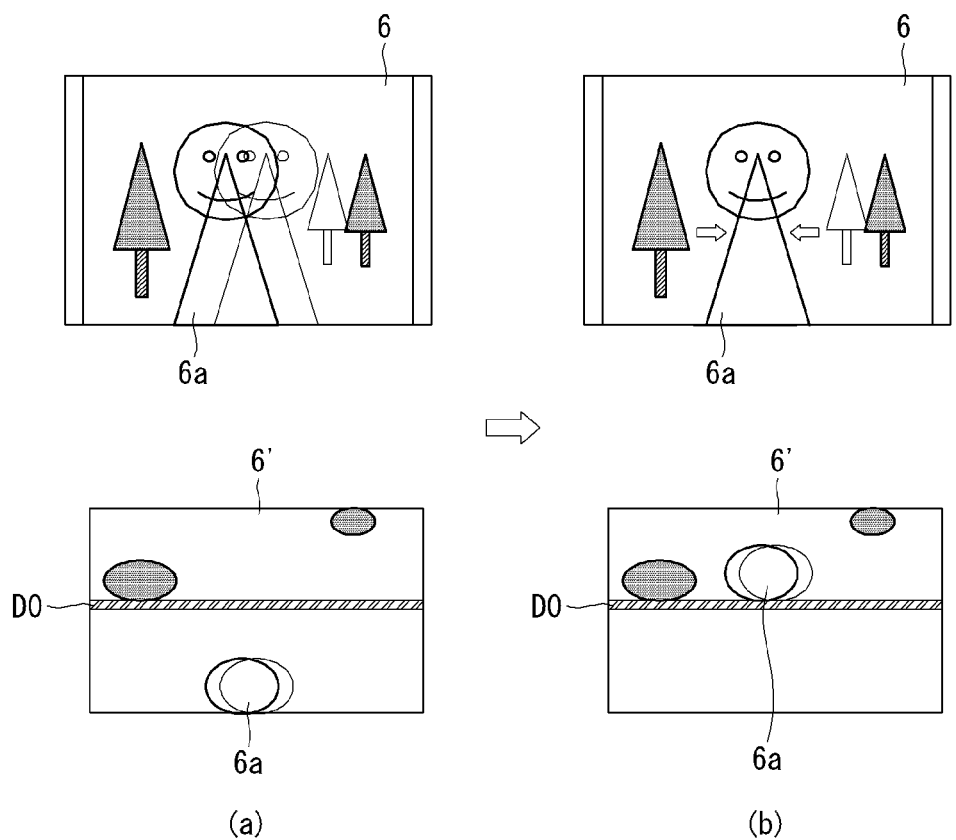
FIGS. 6 to 10 are views for describing the control method according to the first embodiment of the present invention.
Figure 7:
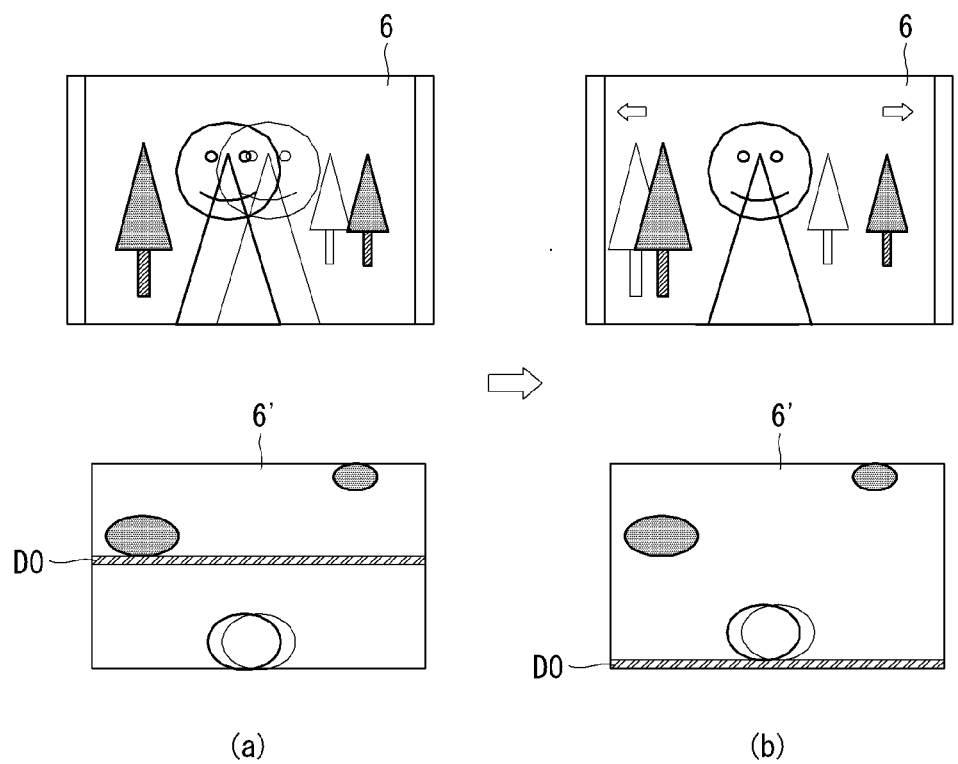

FIGS. 6 and 7 illustrate examples of adjusting parallax of a first image while the screen shift process is performed. In particular, FIGS. 6(*a*) and 6(*b*) and FIGS. 7(*a*) and 7(*b*) respectively illustrate before and after examples of the screen shift process.

Referring to FIG. 6(*a*), the first image 6 includes an object 6a having a negative parallax. Accordingly, when the screen shift process starts, the controller 180 adjusts the object 6a from the negative parallax to the positive parallax as shown in FIG. 6(*b*), so that the object 6a appears to be depressed from the display plane D0.

Referring to FIG. 7(*a*), the first image 6 has a depth to allow the image 6 to appear to be protruded from the display plane. Accordingly, as the screen shift process starts, the controller 180 adjusts the overall parallax of the first image 6 so that the first image 6 appears to be depressed from the display plane D0 as shown in FIG. 7(*b*).

Further, in step S104, the controller 180 may control the parallax of the second image to appear to be depressed from the display plane while the screen shift process is in process. Here, controlling the parallax of the second image in response to a request of screen shift process can be performed by the same method as the method of controlling the parallax of the first image, and thus, the detailed description is omitted.

Figure 8:
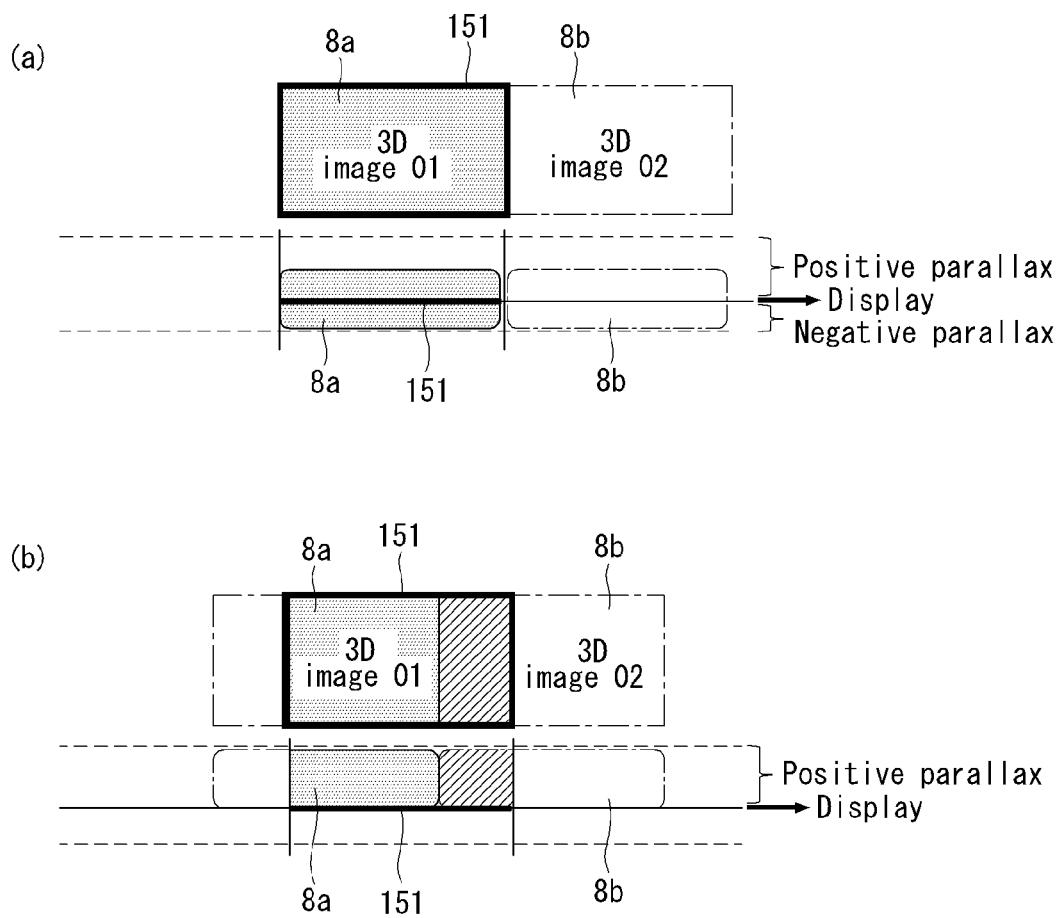
Figure 9:
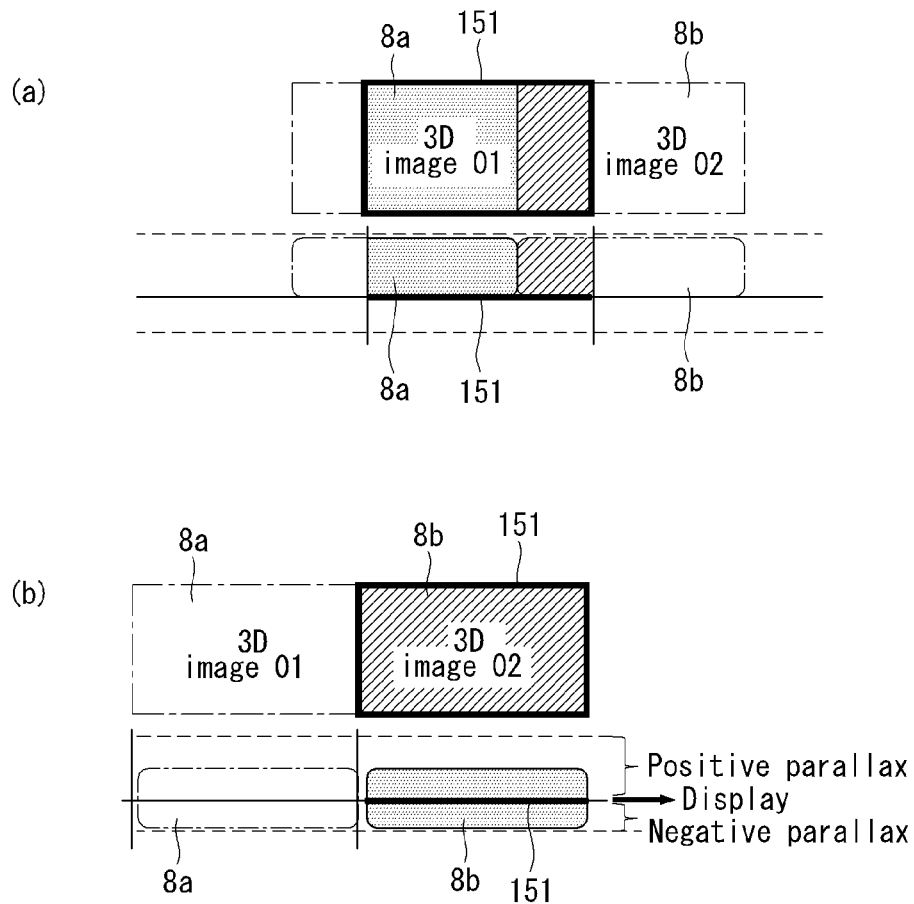

Next, FIGS. 8 and 9 illustrate examples of changes in parallax depending on screen shift process. In particular, FIGS. 8(*a*) and 8(*b*) respectively show examples of changes in parallax of first and second images 8a and 8b before and after screen shift process is initiated.

Referring to FIG. 8(*a*), the first and second images 8a and 8b cause both negative and positive parallax. As shown in FIG. 8(*a*), when the screen shift process to the second image 8b is requested while the first image 8a is displayed, the controller 180 enables the first and second images 8a and 8b to have positive parallax as shown in FIG. 8(*b*). That is, the controller 180 controls the depths of the first image 8a and the second image 8b so that the first and second images 8a and 8b appear to be depressed from the display plane.

Next, FIGS. 9(*a*) and 9(*b*) illustrate examples of changes in parallax of the first and second images 8a and 8b while and after performing screen shift process. Referring to FIG. 9(*a*), as the screen shift to the second image 8b is performed while the first image 8a is displayed, the first and second images 8a and 8b are adjusted to be both included in a positive parallax range. Thereafter, as shown in FIG. 9(*b*), as the screen shift process is finished, the controller 180 adjusts the parallax of the first and second images 8a and 8b back to the original parallax.

Returning to FIG. 5, in step S104, the controller 180 can control the parallax of the first and second images to gradually vary so as to prevent the screen shift from being sharply done. For example, as a request for the screen shift process is received, the controller 180 can control the parallax of the first and second images so that while the first image is shifted to the second image, the parallax of the first and second images is gradually included in a predetermined range, and at a particular time point, the parallax of the first and second images is changed back to the original parallax.

The time point the parallax of the first and second images return to the original parallax may include various time points, such as a predetermined time after the screen shift process is requested, a predetermined time before the screen shift process is finished, or when the screen shift process is finished when a ratio of the second image displayed on the overall screen has a predetermined value or more or the degree of the second image displayed on the screen has a predetermined value or more.

On the other hand, as shown in FIG. 6, when the parallax of some objects are only adjusted, the controller 180 can gradually adjust the parallax of the objects by gradually shifting the positions of the objects displayed on the left eye's image and the right eye's image.

On the contrary, in the situation shown in FIG. 7, the overall parallax of the first or second image is adjusted when the screen shift process is performed, and the controller 180 can implement a gradual change in the parallax of the first and second images by gradually shifting the position of synchronization of the left eye's image and right eye's image included in the first or second image. For gradual shifting of the position of synchronization, the controller 180 can control the left eye's image and the right eye's image constituting each image to have different travelling speeds while the images are shifted by the screen shift process.

Figure 10:
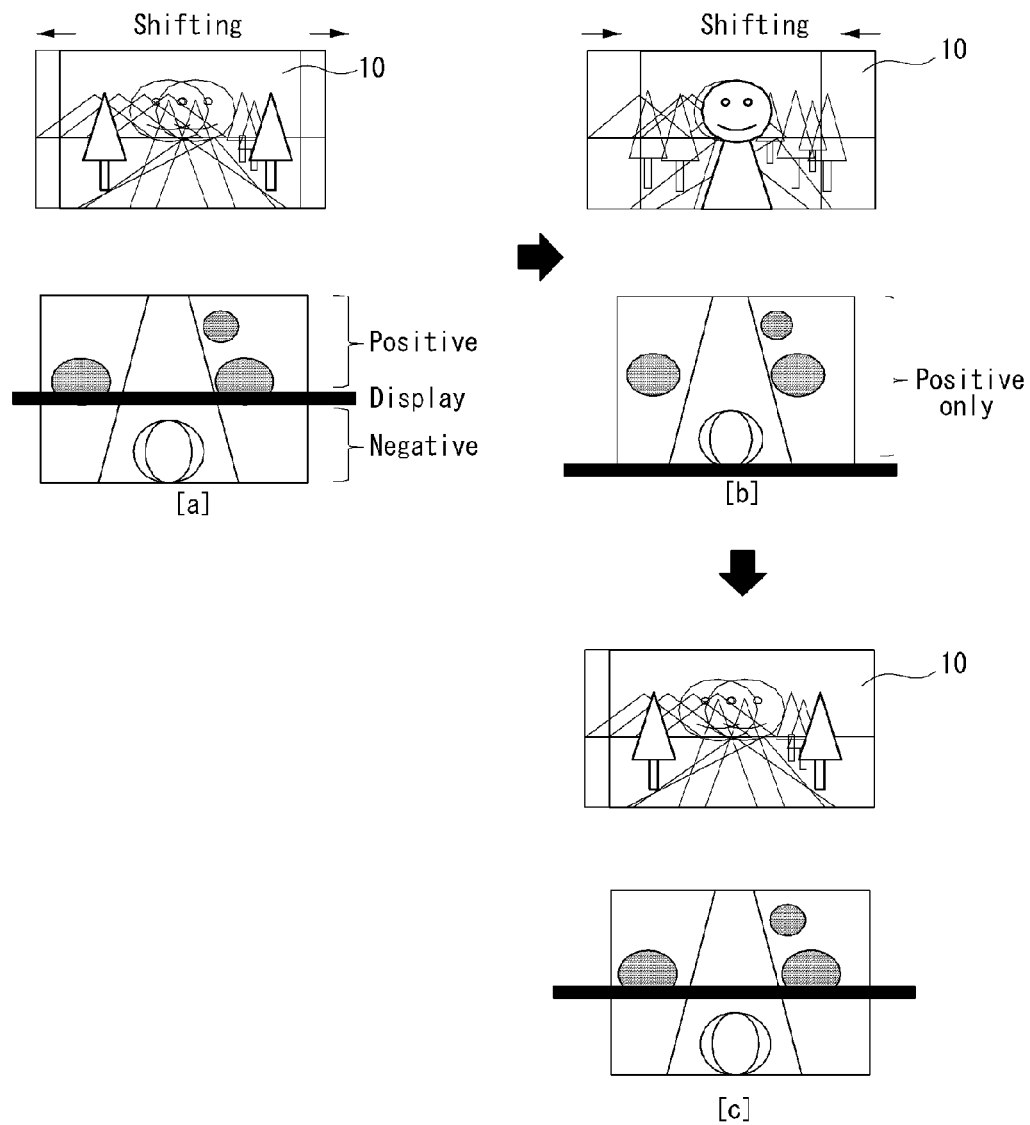

Next, FIG. 10 illustrates a gradual change in parallax during the screen shift process. Referring to FIG. 10(*a*), as the screen shift process is requested, the controller 180 enables the travelling speeds of the left eye's image and the right eye's image constituting the first image 10 to be different from each other during the screen shift process, so that the parallax of the left eye's image and the right eye's image are gradually included in a positive parallax range.

As the parallax of the first image 10 gradually travels into the positive parallax range, the first image forms a 3D effect that allows the first image to be viewed as if it gradually recedes, so that the focused target in the first image 10 is changed from the tree to the human positioned in the closest distance in the first image 10.

Thereafter, as a particular time passes, the controller 180 changes the travelling speeds of the left eye's image and the right eye's image constituting the first image 10 so that the parallax of the left eye's image and the right eye's image is restored to the original parallax. Accordingly, the first image gradually protrudes forward thereby restoring to the original one, and the focused target in the first image 10 is changed back from the human to the tree.

In general, the negative parallax of a stereoscopic image induces more fatigue than the positive parallax, and when the screen shift process is in progress, a user's fatigue is further increased. Accordingly, in the first embodiment of the present invention, upon the screen shift process, the parallax of the stereoscopic image is temporarily shifted into the positive parallax range, and as a predetermined time passes, the parallax is restored to the original one, thereby minimizing the user's fatigue.

A method of controlling the electronic device and an operation of the electronic device according to a second embodiment of the present invention will now be described in greater detail with reference to the drawings.

Figure 11:
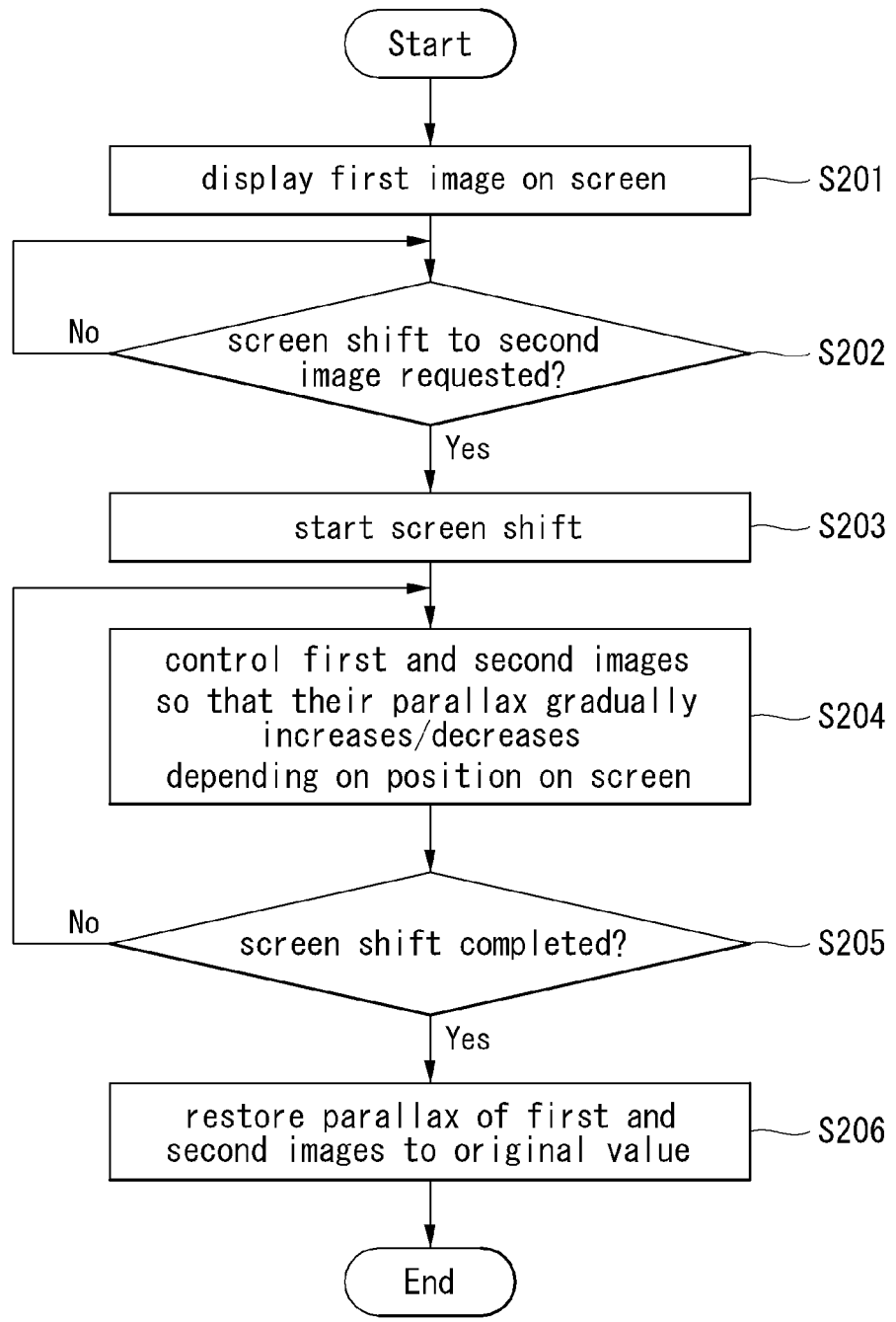
FIG. 11 is a flowchart illustrating a method of controlling an electronic device according to a second embodiment of the present invention.
Figure 12:
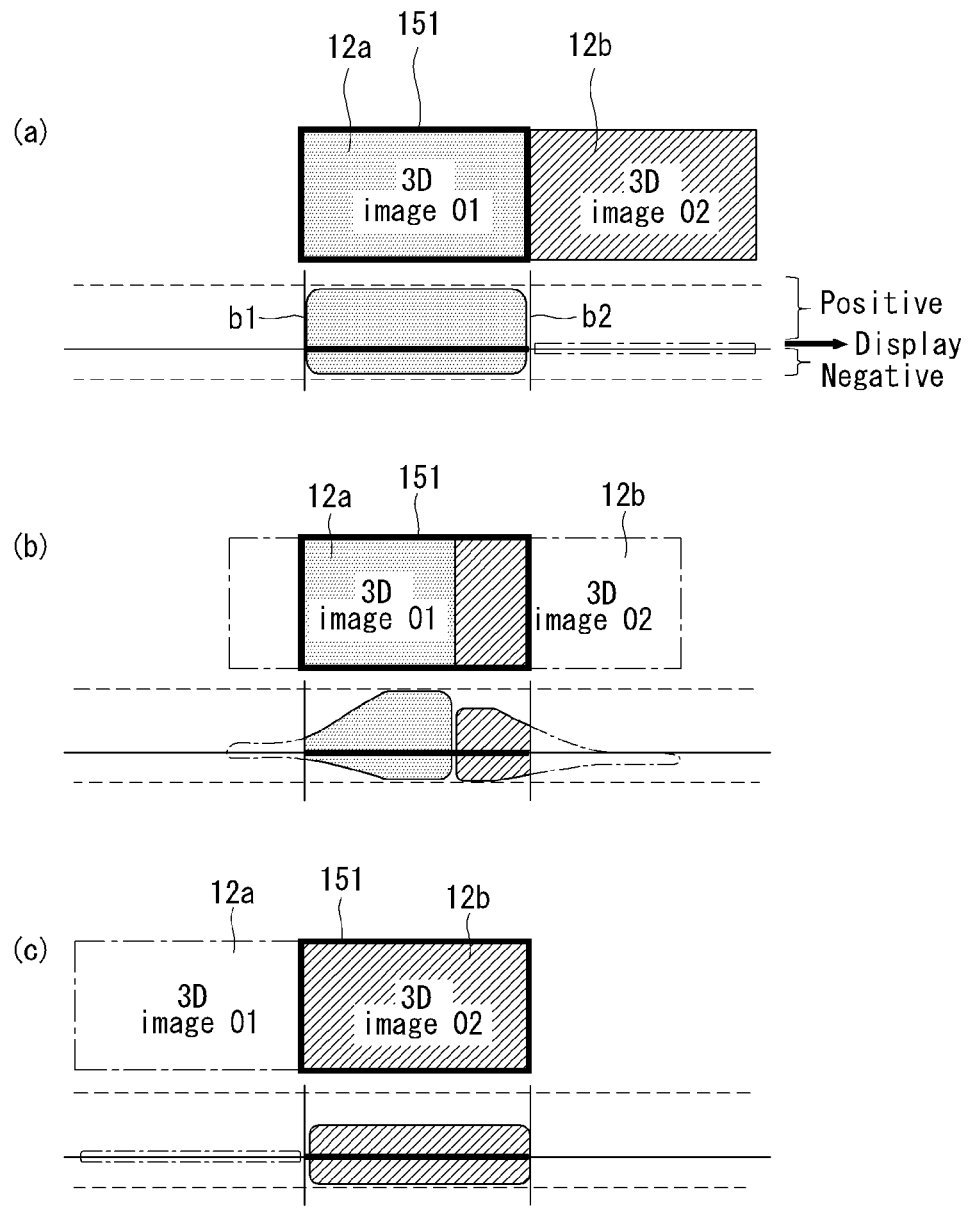
FIG. 12 is a view illustrating controlling parallax of first and second images so that the parallax gradually decreases/increases depending on the position on the screen of the electronic device according to the second embodiment of the present invention.

In particular, FIG. 11 is a flowchart illustrating a method of controlling the electronic device 100 according to the second embodiment of the present invention, and FIG. 12 is a view for describing the control method according to the second embodiment of the present invention.

Referring to FIG. 11, the controller 180 displays a first image based on a user's control input (S201). While displaying the first image, the controller 180 can activate the panel in the display module 151 to implement stereoscopic vision, and thus display a stereoscopic image. In response to a request that the first image be shifted to a second image (Yes in S202), the controller 180 initiates the screen shift process (S203).

As the screen shift process begins, the controller 180 gradually moves the first image toward a first edge of the screen so that the first image comes is outside of the screen while the second image gradually comes in the screen from a second edge of the screen and is thus displayed on the screen.

Meanwhile, while the first and second images are gradually on the move after the screen shift process is initiated, the controller 180 controls the parallax of the first and second images so that the parallax gradually decreases/increases depending on the position of the images on the screen (S204). Thereafter, when the screen shift process is done (Yes in S205), the controller 180 restores the parallax of the first and second images to their original parallax (S206). When the first image fully disappears from the screen and the whole second screen is on the screen, the controller 180 determines it as completion of the screen shift process.

In step S204, when the first image gradually disappears from the screen through the first edge as the screen shift process is performed, the controller 180 may enable the parallax of the first image to decrease as it is pushed toward the first edge. That is, the controller 180 controls the parallax of the first image so that as approaching the first edge of the screen, the parallax of the first image reduces.

In step S204, when the second image gradually appears to the screen through the second edge as the screen shift process is performed, the controller 180 may enable the parallax of the second image to increase as it becomes far away from the second edge where the second image comes, so that upon approaching a predetermined time point, the parallax is changed back to the original parallax. That is, the controller 180 controls the parallax of the second image so that the parallax of a part of the second image, which is displayed on the screen, gradually increases from its minimum value back to the original parallax.

Next, FIG. 12 illustrates an example of controlling first and second images so that parallax gradually decreases/increases depending on the position of the images on the screen. Referring to FIG. 12, when screen shift initiates from the first image 12a to the second image 12b, the controller 180 changes the parallax of the second image 12b to its minimum value as shown in FIG. 12(a).

Thereafter, as the screen shift process proceeds, the controller 180 reduces the parallax of a part of the first image 12a as the part of the first image 12a is shifted to a left edge b1 of the screen. Accordingly, as the screen shift process is ongoing, the second image 12a has an increasing part whose parallax reduces, and if the screen shift process is finished, the parallax of the entire first image 12a is reduced to its minimum value as shown in FIG. 12(c).

Further, as the screen shift process is occurring, the controller 180 gradually increases the parallax of a part of the second image 12b as the part of the second image 12b is away from a right edge b2, thereby restoring back to the original parallax as shown in (b) of FIG. 12(b). Accordingly, as the screen shift process is in process, the second image 12b has an increasing part which restores back to its original parallax, and as the screen shift process is done, the overall second image 12b is changed back to its original parallax.

Turning back to FIG. 11, in step S204, the controller 180 may also control the parallax of the first and second images partially or for each and every object so that the parallax gradually decreases/increases depending on the position on the screen. A method of controlling the parallax for each and every object is similar to the method described in connection with FIG. 6, and the detailed description is omitted.

In general, a sudden change in stereoscopic images may cause a user to feel more fatigue because it prohibits them from immediately adapting to the change. Further, it is more difficult to implement a large parallax for the edge on the screen. Accordingly, in the second embodiment, upon the screen shift process, the reduction of parallax is gradually conducted from the part that is to be pushed out through the edge, and more parallax is put to the part appearing to the screen, thereby preventing the edge on the screen from appearing broken without sudden changes in depth.

The present invention can be implemented via a computer readable recording medium that may be any data storage device that may store data and may be read by a computer system. Examples of the computer readable recording medium may include read-only memory (ROM), random-access memory (RAM), CD-ROMs, DVD±ROM, DVD-RAM, magnetic tapes, floppy disks, and optical data storage devices. The computer readable recording medium may also be distributed over network coupled computer systems such that the computer readable code is stored and executed in a distributed manner.

The foregoing embodiments and features are merely exemplary in nature and are not to be construed as limiting the present invention. The disclosed embodiments and features may be readily applied to other types of apparatuses. The description of the foregoing embodiments is intended to be illustrative, and not to limit the scope of the claims. Many alternatives, modifications, and variations will be apparent to those skilled in the art.

What is claimed is:
1. An electronic device comprising:
   a display module configured to display a stereoscopic image using a left eye's image and a right eye's image; and
   a controller configured to:
      display a first stereoscopic image on the display module;
      receive a request to shift the first stereoscopic image displayed on the display module to a second stereoscopic image;
      change a parallax of the second stereoscopic image to zero parallax;
      display the first stereoscopic image to disappear to a first edge of a screen in the display module at a predetermined speed and the second stereoscopic image to appear from a second edge of the screen at the predetermined speed while shifting the first stereoscopic image to the second stereoscopic image; and
      change a parallax of the first stereoscopic image according to a distance from the first edge of the screen, and change the zero parallax of the second stereoscopic image according to a distance from the second edge of the screen, wherein the parallax of the first stereoscopic image is gradually decreased to the other end from one end of the first stereoscopic image until an entire area of the first stereoscopic image disappears through the first edge of the screen, and wherein the parallax of the second stereoscopic image is gradually increased to the other end from one end of the second stereoscopic image until an entire area of the second stereoscopic image appears through the second edge of the screen.

2. The electronic device of claim 1, wherein the controller is further configured to restore the parallax of the first stereoscopic image and the second stereoscopic image when the shifting is finished.

3. The electronic device of claim 1, wherein the controller is further configured to change a moving speed of a left eye's image and a right eye's image differently so that the negative parallax of the first stereoscopic image and the second stereoscopic are gradually changed.

4. A method of controlling an electronic device, the method comprising:

displaying a first stereoscopic image using a left eye's image and a right eye's image on a display module of the electronic device;

receiving a request to shift the first stereoscopic image to a second stereoscopic image;

changing a parallax of the second stereoscopic image to zero parallax;

displaying the first stereoscopic image to disappear to a first edge of a screen in the display module at a predetermined speed and the second stereoscopic image to appear from a second edge of the screen at the predetermined speed while shifting the first stereoscopic image to the second stereoscopic image; and changing a parallax of the first stereoscopic image according to a distance from the first edge of the screen and the zero parallax of the second stereoscopic image according to a distance from the second edge of the screen, wherein the parallax of the first stereoscopic image is gradually decreased to the other end from one end of the first stereoscopic image until an entire area of the first stereoscopic image disappears through the first edge of the screen, and wherein the parallax of the second stereoscopic image is gradually increased to the other end from one end of the second stereoscopic image until an entire area of the second stereoscopic image appears through the second edge of the screen.

* * * * *